(12) United States Patent
Takahashi et al.

(10) Patent No.: US 6,630,065 B2
(45) Date of Patent: Oct. 7, 2003

(54) POWDER OF ELECTROLYTIC MANGANESE DIOXIDE AND PROCESS FOR PRODUCING THE SAME

(75) Inventors: Kenichi Takahashi, Yamaguchi (JP); Kazuyuki Chiba, Miyazaki (JP); Toru Tsuyoshi, Miyazaki (JP); Masanori Ichida, Miyazaki (JP)

(73) Assignee: Tosoh Corporation, Shinnanyo (JP)

( * ) Notice: Subject to any disclaimer, the term of this patent is extended or adjusted under 35 U.S.C. 154(b) by 0 days.

(21) Appl. No.: 09/941,808

(22) Filed: Aug. 30, 2001

(65) Prior Publication Data

US 2002/0046955 A1 Apr. 25, 2002

(30) Foreign Application Priority Data

Sep. 1, 2000 (JP) ......................... 2000-269886
Mar. 23, 2001 (JP) ......................... 2001-085961

(51) Int. Cl.⁷ .............................. C25B 1/00; H01M 4/50
(52) U.S. Cl. ........................ 205/539; 205/541; 429/224
(58) Field of Search .................................. 205/541, 539, 205/540, 542; 429/224

(56) References Cited

U.S. PATENT DOCUMENTS

| | | | | |
|---|---|---|---|---|
| 5,866,278 A | * | 2/1999 | Sumida et al. | 429/224 |
| 5,938,910 A | * | 8/1999 | Takehara et al. | 205/51 |
| 6,214,198 B1 | * | 4/2001 | Andersen et al. | 205/541 |

\* cited by examiner

*Primary Examiner*—Arun S. Phasge
(74) *Attorney, Agent, or Firm*—Oblon, Spivak, McClelland, Maier & Neustadt, P.C.

(57) ABSTRACT

A powder of electrolytic manganese dioxide and a process for producing the same are disclosed. The powder has a maximum particle diameter of 100 $\mu$m or smaller, a content of 1 $\mu$m and smaller particles of lower than 15% by number, and a median diameter of from 20 to 60 $\mu$m, and which has a potential of 270 mV or higher in terms of the potential of a suspension of the powder in 40% aqueous KOH solution as measured using a mercury/mercury oxide reference electrode as a base.

8 Claims, No Drawings

POWDER OF ELECTROLYTIC MANGANESE DIOXIDE AND PROCESS FOR PRODUCING THE SAME

FIELD OF THE INVENTION

The present invention relates to a powder of electrolytic manganese dioxide which has specific properties and is suitable for use as a positive-electrode active material in, e.g., manganese dry cells, in particular, alkaline manganese dry cells. The invention further relates to a process for producing the powder.

DESCRIPTION OF THE RELATED ART

Powders of electrolytic manganese dioxide are known as the positive-electrode active material of, e.g., manganese dry cells or alkaline manganese dry cells, and have advantages of excellent storage stability and inexpensiveness.

In particular, the alkaline manganese dry cells employing a powder of electrolytic manganese dioxide as the positive-electrode active material have excellent discharge characteristics in heavy discharge use. Because of this, these dry cells are extensively used in applications ranging from electronic cameras, portable tape recorders, and portable information apparatus to game machines and toys, and there is a rapidly growing demand for these. However, the alkaline manganese dry cells have a drawback that as the discharge current increases, the amount of the powder of electrolytic manganese dioxide which can be utilized as a positive-electrode active material decreases and the discharge voltage becomes low, resulting in a considerably reduced discharge capacity. In other words, the alkaline manganese dry cells have a drawback that when the cells are used in apparatus operated at a high current, the electrolytic manganese dioxide packed as a positive-electrode active material is not sufficiently utilized, resulting in a reduced operating time.

The most effective means for overcoming the drawback described above is to employ a powder of electrolytic manganese dioxide which has a higher potential in terms of the potential of a suspension thereof in 40% aqueous KOH solution as measured using a mercury/mercury oxide reference electrode as a base (hereinafter referred to as "alkali potential") so as to heighten the discharge voltage of a cell. The higher the alkali potential of electrolytic manganese dioxide, the more the time period can be prolonged in which an allowable discharge voltage can be maintained in actual use. Furthermore, by packing a powder of electrolytic manganese dioxide in a sufficient amount into a cell, the substantial cell capacity can be increased and, hence, the time period in which an allowable discharge voltage can be maintained in actual use can be further prolonged. Namely, the powders of electrolytic manganese dioxide especially for use in alkaline manganese dry cells are required to have a sufficiently high alkali potential or have both a high alkali potential and high packability.

However, the conventional powders of electrolytic manganese dioxide have an insufficient alkali potential and it has been difficult to attain high packability.

The potential of conventional powders of electrolytic manganese dioxide in an alkaline electrolyte is 250 mV when measured using a mercury/mercury oxide reference electrode as a base. This value of potential corresponds to a voltage of 1.55 V in the case of alkaline manganese dry cells employing zinc metal as a negative-electrode active material. When a current of 1 A is taken out of such an alkaline manganese dry cell, the cell voltage decreases by 350 mV to 1.20 V. Since the minimum voltage required for an alkaline manganese dry cell to operate an instrument is generally 0.9 V, the width of the usable discharge voltage is about 300 mV at the most, ranging from about 1.20 V to 0.9 V, because the potential of the powder of electrolytic manganese dioxide in an alkaline electrolyte is 250 mV at the most.

Especially for use as the positive-electrode active material of an alkaline manganese dry cell, a powder of electrolytic manganese dioxide is compacted into a disk or ring form and this powder compact is used as the positive electrode of the cell.

When this powder compact has a high density $\rho$, the powder of electrolytic manganese dioxide can be packed in an increased amount into the cell to thereby increase the cell capacity. However, the powder compacts formed from the conventional powders of electrolytic manganese dioxide by compacting 5 g of the powder at a pressure of 3 ton into a disk having a diameter of 2 cm have a density $\rho$ of 3.2 g/cm$^3$ at the most. Namely, the conventional powders have had a drawback of insufficient packability.

Furthermore, the powder of electrolytic manganese dioxide disclosed in PCT International Publication WO 00/37714 (Karr Mcgee, U.S.A.) has the following and other drawbacks. Since this powder is produced through low-current-density electrolysis, it has such a particle constitution that the content of particles not smaller than 74 $\mu$m in terms of particle diameter is as high as 9%. The presence of such coarse particles results in a reduced coefficient of use during discharge at a high current. Moreover, the powder necessitates a compaction pressure of 4.5 ton for obtaining a necessary packing density, so that the impregnation of the resulting positive-electrode mix with water, which is necessary for discharge from the powder of electrolytic manganese dioxide, is insufficient and, hence, a sufficient coefficient of use cannot be obtained. In addition, the conventional powder has poor productivity because the electrolysis is conducted at a low current density.

SUMMARY OF THE INVENTION

One object of the invention is to provide a powder of electrolytic manganese dioxide which is especially for use as the positive-electrode active material of an alkaline manganese dry cell, and which has a high alkali potential in an alkaline electrolyte or has a high potential in an alkaline electrolyte and high packability.

Another object of the invention is to provide a process for producing the powder.

The present inventors made intensive investigations. As a result, they have succeeded in producing a powder of electrolytic manganese dioxide which has a high potential in an alkaline electrolyte or has a high potential in an alkaline electrolyte and high packability. Furthermore, a process for producing this powder of electrolytic manganese dioxide has been completed as a result of investigations on conditions for electrolysis for producing electrolytic manganese dioxide, i.e., electrolysis temperature and electrolyte concentration.

The invention provides a powder of electrolytic manganese dioxide which has a high potential in an alkaline electrolyte or has a high potential in an alkaline electrolyte and high packability. Specifically, the invention provides a powder of electrolytic manganese dioxide which has a maximum particle diameter of 100 $\mu$m or smaller, a content of 1 $\mu$m and smaller particles of lower than 15% by number, and a median diameter of from 20 to 60 $\mu$m, and which has a potential of 270 mV or higher in terms of the potential of a suspension of the powder in 40% aqueous KOH solution as measured using a mercury/mercury oxide reference electrode as a base. This powder of electrolytic manganese dioxide is preferably one which, when compacted at a pressure of 3 ton/cm$^2$, gives a compact having a density ($\rho$) in the range of from $3.20 \leq \rho \leq 3.35$.

The invention further provides a process for producing the powder of electrolytic manganese dioxide which comprises preparing an aqueous solution of manganese sulfate and sulfuric acid which has a bivalent manganese concentration of from 35 to 60 g/L, a sulfuric acid concentration of from 35 to 60 g/L, and a temperature of 90° C. or higher, using the aqueous solution as an electrolyte to conduct electrolysis in an electrolytic cell equipped with an anode and a cathode at a current density of from 70 to 100 A/m$^2$ to electrolytically deposit manganese dioxide on the anode, removing the electrolytic manganese dioxide deposit from the anode, pulverizing the resulting solid masses of the electrolytic manganese dioxide, and then classifying the resulting particles.

DETAILED DESCRIPTION OF THE INVENTION

In the case where the powder of electrolytic manganese dioxide is used as a positive-electrode active material, in particular, that of an alkaline manganese dry cell, carbon or the like is added to the powder of electrolytic manganese dioxide in order to impart electrical conductivity thereto and this powder mixture is compacted into a disk or ring form to give a powder compact for use as the positive electrode of a cell. This powder compact is inserted into a cylindrical cell can made of iron and plated with nickel to constitute a cell.

The powder of electrolytic manganese dioxide of the invention should have specific values of maximum particle diameter, the number of 1 $\mu$m and smaller particles, and median diameter. The reasons for this are as follows.

If coarse particles larger than 100 $\mu$m are present in the powder of electrolytic manganese dioxide obtained by the invention, the powder mars the inner wall of the cell can to break the deposit layer formed on the cell can. As a result, a reaction with the exposed iron occurs to cause gas generation, etc. Furthermore, such a powder may break the separator which electrically insulates zinc serving as the negative electrode of the cell from the positive electrode thereof, i.e., the powder compact obtained by compacting the powder of electrolytic manganese dioxide. As a result, the powder of electrolytic manganese dioxide serving as the positive-electrode active material comes into direct contact with the zinc serving as the negative electrode of the cell. Namely, self-discharge occurs during storage of the cell, leading to a decrease in capacity.

On the other hand, the presence of particles of 1 $\mu$m and smaller is disadvantageous in that such fine particles impair contact with the carbon for imparting electrical conductivity. If the content of such fine particles is 15% by number or higher, the amount of electrolytic manganese dioxide which can be utilized is considerably reduced.

Furthermore, a powder of electrolytic manganese dioxide having a median diameter exceeding 60 $\mu$m has a reduced total surface area and hence impaired reactivity. On the other hand, a powder of electrolytic manganese dioxide having a median diameter smaller than 20 $\mu$m has considerably impaired packability.

For the reasons shown above, the powder of electrolytic manganese dioxide of the invention should have a maximum particle diameter of 100 $\mu$m or smaller, a content of 1 $\mu$m and smaller particles of lower than 15% by number, and a median diameter of from 20 to 60 $\mu$m. It is a matter of course that the effects of the powder are enhanced when the content of 1 $\mu$m and smaller particles therein is lower than 10% by number and the proportion of 74 $\mu$m and larger particles therein is lower than 4.5% by weight.

As stated above, it is important for the powder of electrolytic manganese dioxide of the invention to be regulated with respect to maximum particle diameter, the number of 1 $\mu$m and smaller particles, and median diameter. It is also important that the powder should have a high alkali potential. Particle size analysis for powders of electrolytic manganese dioxide according to the invention was conducted by the following method.

Method for Determining Maximum Particle Diameter, Number of 1 $\mu$m and Smaller Particles, and Median Diameter A powder of electrolytic manganese dioxide produced by the process of the invention was analyzed by the light scattering method (apparatus: Microtrac (trade name), manufactured by Nikkiso Co., Ltd.), in which a suspension of the powder in a medium was irradiated with a laser light and the resulting scattered light was examined to measure the diameters of the particles of the powder of electrolytic manganese dioxide and determine the number thereof. Thus, the maximum particle diameter of the electrolytic manganese dioxide, the number of 1 $\mu$m and smaller particles, and the median diameter of the powder were determined.

For use especially in alkaline manganese dry cells having a high capacity, the powder of electrolytic manganese dioxide should have a high potential in an alkaline electrolyte as stated above. The method used in the invention for determining the potential of a powder of electrolytic manganese dioxide in 40% aqueous KOH solution will be explained below.

Method for Determining Potential of Powder of Electrolytic Manganese Dioxide in 40% Aqueous KOH Solution The potential of a powder of electrolytic manganese dioxide in 40% aqueous KOH solution in the invention was measured by adding 5 mL of 40% aqueous KOH solution to 2 g of the powder of electrolytic manganese dioxide, mixing the powder of electrolytic manganese dioxide with the aqueous KOH solution to obtain a slurry, and measuring the potential of this slurry using a mercury/mercury oxide reference electrode as a base. The powder of electrolytic manganese dioxide was evaluated in terms of this alkali potential.

For use in high-capacity alkaline manganese dry cells, a powder of electrolytic manganese dioxide should have high packability. The powder of electrolytic manganese dioxide of the invention has high packability, and this was ascertained by the following method for measuring the compact density $\rho$ of the powder of electrolytic manganese dioxide of the invention.

Method for Determining Powder Compact Density $\rho$

A 5 g portion was taken from a powder of electrolytic manganese dioxide produced by the process of the invention and placed in a cylindrical mold having a diameter of 2 cm. The powder in the mold was compressed from the upper and lower sides thereof at a pressure of 3 ton/cm$^2$. The thickness of the resulting disk-form powder compact was measured, and the volume of the powder compact was calculated from the diameter thereof. The density $\rho$ of the powder compact was determined from the volume and weight thereof.

The powder of electrolytic manganese dioxide of the invention, when compacted at a pressure of 3 ton/cm$^2$, preferably gives a disk-form powder compact having a density $\rho$ of from 3.20 to 3.35 g/cm$^3$.

In the process of the invention, a powder of electrolytic manganese dioxide is produced by preparing an aqueous solution of manganese sulfate and sulfuric acid which has a bivalent manganese ($Mn^{2+}$) concentration of from 35 to 60 g/L, a sulfuric acid concentration of from 35 to 60 g/L, and a temperature of 90° C. or higher, using the aqueous solution as an electrolyte to conduct electrolysis in an electrolytic cell equipped with an anode and a cathode at a current density of from 70 to 100 A/m² to electrolytically deposit manganese dioxide on the anode, removing the electrolytic manganese dioxide deposit from the anode, pulverizing the resulting solid masses of the electrolytic manganese dioxide, and then classifying the resulting particles. The reasons for this are as follows.

Manganese dioxide electrolytically deposits on the anode as a result of the reaction shown by the following reaction formula (1).

$$Mn^{2+} + 2O^{2-} \rightarrow MnO_2 + 2e^- \tag{1}$$

If the $Mn^{2+}$ concentration in the electrolyte is as low as below 35 g/L, the supply of $Mn^{2+}$ to the anode becomes insufficient. As a result, the electrolytic voltage increases, leading to the generation of oxygen on the anode and a reduced efficiency.

If the $Mn^{2+}$ concentration is higher than 60 g/L, $\beta$-$MnO_2$, having a low alkali potential, generates in the electrolytic manganese dioxide being yielded.

The influences of sulfuric acid concentration have not been fully elucidated. However, if the sulfuric acid concentration is lower than 35 g/L, $\beta$-$MnO_2$, having a low alkali potential, generates in the electrolytic manganese dioxide. If the sulfuric acid concentration is higher than 60 g/L, the electrolytic voltage increases, leading to the generation of oxygen on the anode and a reduced efficiency.

In producing electrolytic manganese dioxide, a wider range of electrolyte concentrations than in the invention can be used. However, in order for the powder of electrolytic manganese dioxide of the invention to have high packability or have both high packability and a high potential in an alkaline electrolyte, it is necessary to regulate the $Mn^{2+}$ concentration and sulfuric acid concentration in the electrolyte. Specifically, the range of the concentration of bivalent manganese ($Mn^{2+}$) is from 35 to 60 g/L and that of sulfuric acid is from 35 to 60 g/L.

In the process of the invention, it is essential to conduct electrolysis at an electrolysis temperature of 90° C. or higher and a current density of from 70 to 100 A/m². The reasons for this are as follows. If the electrolysis temperature is lower than 90° C. or if the current density is lower than 70 A/m² or higher than 100 A/m², then the resulting powder of electrolytic manganese dioxide has a reduced potential in an alkaline electrolyte and insufficient packability, making it impossible to accomplish the objects of the invention.

In Examples of the process of the invention which will be given later, an anode plate made of titanium was used for the electrolytic production of manganese dioxide. However, it is a matter of course that a plate of another material such as a titanium alloy, lead, or graphite is also applicable. It is more desirable to use titanium or a titanium alloy having excellent impact resistance because the electrolytic manganese dioxide deposited on the electrode can be removed therefrom by impacts.

The pulverization in the process of the invention can be accomplished by crushing the electrolytic manganese dioxide with a jaw crusher to obtain masses having sides of up to 3 to 5 cm and then grinding the masses with a roll grinder. Thereafter, pulverization with a mortar was further conducted. According to need, pulverization with a dry ball mill was also used.

Besides the crushing with a jaw crusher, crushing with a gyratory crusher can be conducted in this pulverization. Furthermore, it is a matter of course that grinding with a wet ball mill, grinding with a mill, or the like is applicable in addition to the pulverization with a mortar. Besides being conducted with sieves, the classification can be conducted by a method in which the powder of electrolytic manganese dioxide obtained through pulverization is dispersed in pure water and the particles precipitated are recovered by filtration and dried in a 70° C. air stream. This method is more preferred in that finer particles can be further removed from the powder. Only when the powder of electrolytic manganese dioxide is to be used especially for alkaline manganese dry cells, it is neutralized with an aqueous solution of $Na_2CO_3$ or NaOH and dried. Even in the case where such operations are conducted, the invention is applicable and such operations should not be construed as limiting the scope of the invention.

The invention will be explained below in more detail by reference to Examples and Comparative Examples.

EXAMPLE 1

For producing electrolytic manganese dioxide, an electrolytic cell was used which had a capacity of 20 L and was equipped with a heater. This electrolytic cell had a titanium plate serving as an anode and a graphite plate as a cathode which were suspended so as to face each other. The electrolytic cell further had a tube for supplying a manganese sulfate solution through an upper part of the cell.

A manganese sulfate solution was used as an electrolysis supply. Electrolysis was conducted while introducing this solution into the electrolytic cell. During the electrolysis, the composition of the electrolyte was regulated so as to have a bivalent manganese concentration and a sulfuric acid concentration of 35 g/L and 40 g/L, respectively, and the temperature of the electrolytic cell was kept at 95° C. The electrolysis was conducted at a current density of 80 A/m².

After the electrolysis was conducted for 10 days, the titanium anode plate on which electrolytic manganese dioxide had deposited was taken out and washed with pure water. The electrolytic manganese dioxide deposit adherent to the titanium anode plate was removed therefrom by impacts. The resulting masses of the deposit were crushed with a jaw crusher, subsequently pulverized with a roll mill grinder, and then further pulverized with a mortar. The particles were classified with a 200 mesh sieve to obtain a powder of electrolytic manganese dioxide.

Particles size analysis of the powder of electrolytic manganese dioxide thus obtained was conducted by the light scattering method (apparatus: Microtrack (trade name), manufactured by Nikkiso Co., Ltd.), in which the powder was suspended in pure water as a dispersion medium and this suspension was irradiated with a laser light. As a result, the powder was found to have a maximum particle diameter of 90 μm, a content of 1 μm and smaller particles of 5% by number, and a median diameter of 50 μm. Furthermore, the proportion of particles of 74 μm and larger in the powder was 3.2%. A 2 g portion was taken from this powder of electrolytic manganese dioxide, and 5 mL of 40% KOH solution was added thereto. The potential of the resulting slurry was measured using a mercury/mercury oxide reference electrode as a base to determine the alkali potential of the powder of electrolytic manganese dioxide. As a result, the alkali potential thereof was 320 mV.

Subsequently, a 5 g portion was taken from this powder of electrolytic manganese dioxide and placed in a cylindrical mold having a diameter of 2 cm. The powder in the mold was compressed from the upper and lower sides thereof at a pressure of 3 ton/cm² to obtain a powder compact. The thickness of this powder compact was measured and the density ρ thereof was calculated. As a result, the density ρ of this powder compact formed from the powder of electrolytic manganese dioxide was 3.35 g/cm³.

In Table 1 are shown conditions for the production of this electrolytic manganese dioxide and the results of the measurements of maximum particle diameter, number of 1 μm and smaller particles, median diameter, powder compact density, and alkali potential.

With respect to the following Examples 2 to 12 and Comparative Examples 1 to 6 also, conditions for the production of electrolytic manganese dioxide and the results of property measurements are shown in Table 1.

EXAMPLES 2 TO 4

Powders of electrolytic manganese dioxide were produced in the same manner as in Example 1, except that the electrolytic conditions shown in Table 1 were used. The results of measurements are shown in Table 1.

EXAMPLE 5

A powder of electrolytic manganese dioxide was obtained in the same manner as in Example 1, except that the electrolytic conditions shown in Table 1 were used and that dry pulverization with a ball mill was further conducted for 12 hours. The results obtained are shown in Table 1.

EXAMPLES 6 TO 12

Powders of electrolytic manganese dioxide were produced in the same manner as in Example 5, except that the electrolytic conditions shown in Table 1 were used. The results of measurements are shown in Table 1.

Comparative Example 1

A powder of electrolytic manganese dioxide was obtained in the same manner as in Example 1, except that the electrolytic conditions shown in Table 1 were used and that dry pulverization with a ball mill was further conducted for 24 hours. The results obtained are shown in Table 1.

Compartive Example 2

A powder of electrolytic manganese dioxide was obtained in the same manner as in Example 1, except that the electrolytic conditions shown in Table 1 were used. The results obtained are shown in Table 1.

Comparative Example 3

A powder of electrolytic manganese dioxide was obtained in the same manner as in Example 1, except that the electrolytic conditions shown in Table 1 were used and that dry pulverization with a ball mill was further conducted for 12 hours. The results obtained are shown in Table 1.

Compartive Examples 4 to 6

Powders of electrolytic manganese dioxide were obtained in the same manner as in Example 1, except that the electrolytic conditions shown in Table 1 were used. The results obtained are shown in Table 1.

TABLE 1

| Example and Comparative Example | Electrolytic conditions of production of electrolytic manganese dioxide | | | | Powder of electrolytic manganese dioxide | | | | | Performance of powder of electrolytic manganese Dioxide | | |
|---|---|---|---|---|---|---|---|---|---|---|---|---|
| | Manganese concentration (g/L) | Sulfuric acid concentration (g/L) | Current Density (A/m²) | Electrolysis temperature (° C.) | Maximum Particle diameter (μm) | Proportion of 74 μm and larger particles (%) | Proportion of the number of 1 μm and smaller particles (%) | Median Diameter (μm) | Average Particle Diameter (μm) | Powder capacity density ρ (g/cm³) compaction pressure, 3 ton/cm³ | Alkali potential (mV) | Specific Surface Area (m²/g) |
| Example 1 | 35 | 40 | 80 | 95 | 90 | 3.2 | 5 | 50 | 62 | 3.35 | 320 | 35 |
| Example 2 | 60 | 40 | 90 | 95 | 100 | 4.2 | 3 | 59 | 61 | 3.30 | 285 | 34 |
| Example 3 | 60 | 60 | 80 | 98 | 85 | 2.3 | 7 | 50 | 64 | 3.35 | 300 | 38 |
| Example 4 | 50 | 35 | 100 | 95 | 70 | 0.0 | 10 | 37 | 52 | 3.20 | 318 | 43 |
| Example 5 | 50 | 40 | 90 | 98 | 75 | 0.3 | 11 | 35 | 48 | 3.27 | 310 | 36 |
| Example 6 | 50 | 60 | 80 | 98 | 85 | 2.0 | 12 | 38 | 46 | 3.25 | 290 | 38 |
| Example 7 | 40 | 35 | 100 | 98 | 80 | 1.2 | 9 | 30 | 42 | 3.25 | 310 | 45 |
| Example 8 | 40 | 40 | 90 | 98 | 85 | 2.2 | 9 | 58 | 61 | 3.30 | 295 | 33 |
| Example 9 | 40 | 60 | 80 | 98 | 65 | 0.0 | 12 | 22 | 31 | 3.10 | 300 | 36 |
| Example 10 | 40 | 50 | 80 | 90 | 85 | 2.5 | 10 | 45 | 52 | 3.05 | 325 | 38 |
| Example 11 | 40 | 60 | 70 | 90 | 75 | 0.5 | 11 | 35 | 50 | 3.10 | 310 | 41 |
| Example 12 | 35 | 35 | 80 | 98 | 80 | 1.2 | 6 | 40 | 43 | 3.28 | 315 | 50 |
| Comp. Ex. 1 | 20 | 60 | 70 | 90 | 85 | 3.2 | 21 | 35 | 42 | 2.75 | 260 | 36 |
| Comp. Ex. 2 | 70 | 70 | 110 | 90 | 90 | 5.5 | 7 | 55 | 63 | 2.69 | 255 | 62 |
| Comp. Ex. 3 | 60 | 10 | 90 | 95 | 55 | 0.0 | 35 | 15 | 21 | 2.82 | 238 | 21 |
| Comp. Ex. 4 | 60 | 20 | 100 | 95 | 90 | 1.2 | 5 | 50 | 58 | 3.25 | 264 | 58 |
| Comp. Ex. 5 | 10 | 40 | 50 | 98 | 60 | 0.0 | 21 | 15 | 19 | 2.68 | 240 | 27 |
| Comp. Ex. 6 | 80 | 10 | 80 | 90 | 100 | 7.0 | 2 | 60 | 69 | 3.06 | 235 | 48 |

Table 1 shows the following. The powders of electrolytic manganese dioxide produced in Examples 1 to 12 each had a maximum particle diameter of 100 μm or smaller, a content of 1 μm and smaller particles of lower than 15% by number, a median diameter of from 20 to 60 μm, and an alkali potential of 270 mV or higher.

On the other hand, the powders of electrolytic manganese dioxide produced in Comparative Examples 1 to 6 each had a maximum particle diameter of 100 μm or smaller. However, the powder of Comparative Example 1 had a content of 1 μm and smaller particles of 21% by number and a median diameter of 15 μm. These powders each had an alkali potential lower than 270 mV. Although the powder of Comparative Example 2 had a maximum particle diameter of 100 μm or smaller, a content of 1 μm and smaller particles of 7% by number, and a median diameter of 55 μm, it also had a potential in an alkali solution of lower than 270 mV. This clearly demonstrates that a sufficient potential cannot be obtained when the production conditions used are outside the scope of the process of the invention.

Examples 1 to 12 and Comparative Examples 1 to 6 show that it is more desirable to use an electrolysis temperature of 95° C. or higher for obtaining a powder of electrolytic manganese dioxide which has an alkali potential of 270 mV or higher.

As explained above, the powder of electrolytic manganese dioxide of the invention and the powders of electrolytic manganese dioxide obtained by the process of the invention have such marked and peculiar properties that they have a high potential in an alkaline electrolyte and high packability. When used especially in alkaline manganese dry cells, the powders can be expected to greatly improve the capacity of the alkaline manganese dry cells. The process is highly economical and is effective in greatly improving productivity.

What is claimed is:

1. A powder of electrolytic manganese dioxide, wherein said powder has a maximum particle diameter of 100 μm or smaller, a content of 1 μm and smaller particles of less than 15% by number, a specific surface area of 33 to 50 cm²/g, and a median diameter of from 20 to 60 μm, and wherein said powder has a potential of 270 mV or more in terms of the potential of a suspension of the powder in 40% aqueous KOH solution as measured using a mercury/mercury oxide reference electrode as a base.

2. The powder of electrolytic manganese dioxide according to claim 1, wherein the content of 1 μm and smaller particles is less than 10% by number.

3. The powder of electrolytic manganese dioxide according to claim 1, wherein a proportion of particles having a particle diameter of 74 μm or larger is 4.5% by weight or less.

4. The powder of electrolytic manganese dioxide according to claim 1, wherein when said powder is compacted at a pressure of 3 ton/cm² the resulting compact has a density of 3.20 to 3.35.

5. The powder of electrolytic manganese dioxide according to claim 1, wherein the potential is 300 mV or more in terms of the potential of a suspension of the powder in 40% aqueous KOH solution as measured using a mercury/mercury oxide reference electrode as a base.

6. The powder of electrolytic manganese dioxide according to claim 5, wherein the content of 1 μm and smaller particles in less than 10% by number.

7. The powder of electrolytic manganese dioxide according to claim 6, wherein a proportion of particles having a particle diameter of 74 μm or larger is 4.5% by weight or less.

8. A process for producing a powder of electrolytic manganese dioxide, wherein said powder has a maximum particle diameter of 100 μm or smaller, a content of 1 μm and smaller particles of less than 15% by number, and a median diameter of from 20 to 60 μm, and wherein said powder has a potential of 270 mV or more in terms of the potential of a suspension of the powder in 40% aqueous KOH solution as measured using a mercury/mercury oxide reference electrode as a base, wherein said process comprises preparing an electrolyte having a bivalent manganese concentration of from 35 to 60 g/L, a sulfuric acid concentration of from 35 to 60 g/L, and a temperature of 90° C. or higher, electrolyzing the electrolyte at a current density of from 70 to 100 A/m² to electrolytically deposit manganese dioxide on the anode, removing the electrolytic manganese dioxide deposit from the anode, pulverizing the resulting solid masses of the electrolytic manganese dioxide, and then classifying the resulting particles.

* * * * *